United States Patent
Kim et al.

(10) Patent No.: US 9,280,700 B2
(45) Date of Patent: Mar. 8, 2016

(54) METHOD AND APPARATUS FOR ONLINE SIGNATURE VERIFICATION USING PROXIMITY TOUCH

(71) Applicant: SAMSUNG ELECTRONICS CO., LTD., Suwon-si (KR)

(72) Inventors: Do-hyeon Kim, Suwon-si (KR); Dong-hyuk Lee, Seoul (KR); Seong-taek Hwang, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/484,746

(22) Filed: Sep. 12, 2014

(65) Prior Publication Data

US 2015/0071505 A1    Mar. 12, 2015

(30) Foreign Application Priority Data

Sep. 12, 2013  (KR) .................... 10-2013-0109976

(51) Int. Cl.
*G06K 9/00* (2006.01)
*G06F 3/0488* (2013.01)

(52) U.S. Cl.
CPC ........ *G06K 9/00167* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 5,347,589 A * | 9/1994 | Meeks et al. ................. | 382/119 |
| 8,614,693 B2 | 12/2013 | King et al. | |
| 2007/0271466 A1 | 11/2007 | Mak et al. | |
| 2010/0225443 A1 | 9/2010 | Bayram et al. | |
| 2011/0050394 A1 | 3/2011 | Zhang et al. | |
| 2012/0050007 A1 | 3/2012 | Forutanpour et al. | |
| 2012/0161791 A1 | 6/2012 | Shaw | |
| 2012/0207393 A1 | 8/2012 | Huteaux et al. | |
| 2013/0159721 A1 | 6/2013 | Steyer et al. | |
| 2013/0194223 A1 | 8/2013 | Ward et al. | |
| 2014/0375573 A1* | 12/2014 | Idzik et al. ................... | 345/173 |

FOREIGN PATENT DOCUMENTS

| | | |
|---|---|---|
| EP | 2 605 533 A1 | 6/2013 |
| KR | 10-2013-0075770 A | 7/2013 |
| KR | 10-2013-0075771 A | 7/2013 |

OTHER PUBLICATIONS

Communication dated Dec. 5, 2014 issued by International Searching Authority in counterpart International Patent Application No. PCT/KR2014/008506.

* cited by examiner

*Primary Examiner* — Daniel Mariam
(74) *Attorney, Agent, or Firm* — Sughrue Mion, PLLC

(57) ABSTRACT

A method and apparatus for verifying an input signature are provided. The method includes generating signature data based on a real touch event and a proximity touch event that occur on a touch input unit of and apparatus, extracting a feature of the input signature based on the signature data, and determining whether to authenticate the input signature based on a similarity between the feature of the input signature and a corresponding feature of a previously stored reference signature.

26 Claims, 13 Drawing Sheets

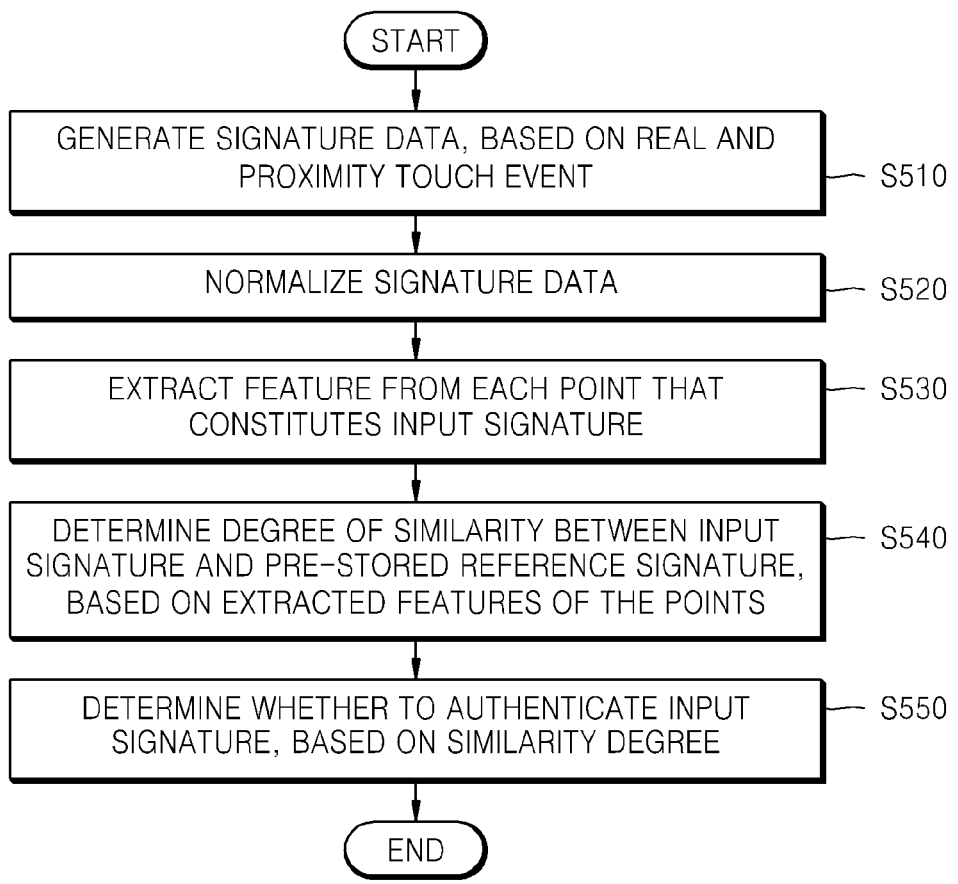

METHOD AND APPARATUS FOR ONLINE SIGNATURE VERIFICATION USING PROXIMITY TOUCH

CROSS-REFERENCE TO RELATED APPLICATION

This application claims priority from Korean Patent Application No. 10-2013-0109976, filed on Sep. 12, 2013 in the Korean Intellectual Property Office, the disclosure of which is incorporated herein in its entirety by reference.

BACKGROUND

1. Field

Apparatuses and methods consistent with exemplary embodiments relate to a method of verifying an online signature and an apparatus for performing the method.

2. Description of Related Art

As electronic and Internet technologies continue to expand and provide access to a greater amount of sensitive information, reliable methods for personal identification are becoming more essential. Each individual has their own unique style of handwriting. Based on the unique characteristics of a handwriting, a signature of an individual may be used for security purposes such as for identifying the individual. Online signature verification denotes a method for verifying a dynamic signature that is input by a user.

In contrast with offline signature verification, online signature verification may be performed according to a stricter standards. For example, in addition to the shape of an individual's signature, the handwriting speed of an individual, a pressure used during the handwriting, an amount of time taken for the handwriting, and the like, may be used to further verify an individual.

Recent products such as smartphones, tablets, personal computers (PCs), and the like have been implemented with a touch screen. Accordingly, the number of products including a proximity touch function (i.e., hovering) is increasing. The proximity touch function is a function of indirectly sensing a pen or a finger when the pen or the finger approaches a touch panel without actually touching the touch panel.

SUMMARY

One or more exemplary embodiments provide a method and apparatus for verifying a signature such as an online signature using a proximity touch function.

According to an aspect of an exemplary embodiment, there is provided a method of verifying an input signature made by a user, including generating signature data based on a touch event and a proximity touch event that occur on a touch input unit of an apparatus, extracting a feature of the input signature based on the signature data, and determining whether to authenticate the input signature based on a similarity between the feature of the input signature and a corresponding feature of a previously received reference signature of the user.

According to an aspect of another exemplary embodiment, there is provided an apparatus for verifying an input signature made by a user, including a generator configured to generate signature data based on a touch event and a proximity touch event that that occur on a touch input unit of an apparatus, an extractor configured to extract a feature of the input signature based on the signature data, and an authenticator configured to determine whether to authenticate the input signature based on a similarity between the feature of the input signature and a corresponding feature of a previously stored reference signature of the user.

According to an aspect of another exemplary embodiment, there is provided an signature verification apparatus including an extractor configured to extract features from a signature input by a user on a touch screen, the extracted features distinguishing between a touch input and a proximity input of the signature input by the user; and a controller configured to determine whether the signature input by the user corresponds to a signature of an authorized user based on the proximity input.

The controller may determine whether the signature input by the user corresponds to the authorized user based on both the touch input and the proximity input.

The controller may determine whether the signature input by the user corresponds to the authorized user based on at least one of a proximity input immediately prior to a touch input and a proximity input immediately after a touch input.

The controller may determine whether the signature input by the user corresponds to the authorized user based on a proximity input that occurs between two touch inputs.

The signature verification apparatus may further include a touch screen for receiving the signature input by the user.

The signature verification apparatus may further include a receiver configured to receive the signature from an external device.

BRIEF DESCRIPTION OF THE DRAWINGS

The above and/or other aspects will become apparent and more readily appreciated from the following description of exemplary embodiments, taken in conjunction with the accompanying drawings in which:

FIG. 5 is a flowchart of a method of verifying a signature based on a degree of similarity between points of a signature, according to an exemplary embodiment;

DETAILED DESCRIPTION

Figure 1:
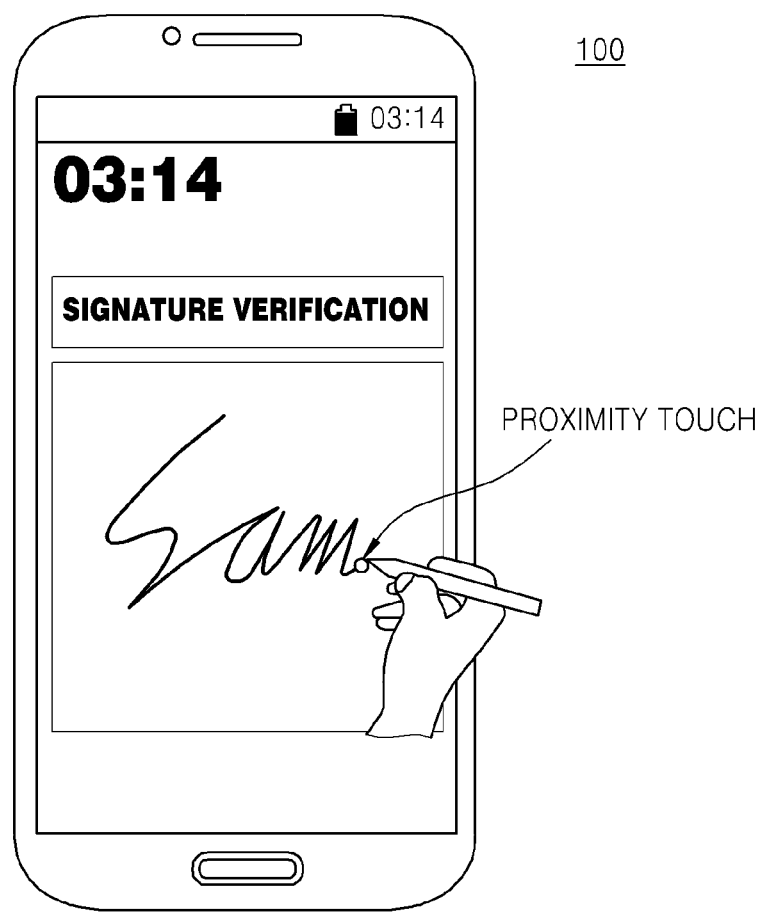
FIG. 1 is a diagram illustrating verifying a signature via a real touch and a proximity touch according to an exemplary embodiment.

Reference will now be made in detail to embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Although general terms widely used at present were selected for describing the exemplary embodiments in consideration of the functions thereof, these general terms may vary according to intentions of one of ordinary skill in the art, case precedents, the advent of new technologies, and the like. Terms arbitrarily selected may also be used in a specific case.

The terms "comprises" and/or "comprising" or "includes" and/or "including" when used in this specification, specify the presence of stated elements, but do not preclude the presence or addition of one or more other elements. The terms "unit" and "module" when used in this specification refer to a unit in which at least one function or operation is performed, and may be implemented as hardware, software, or a combination of hardware and software.

Throughout the specification, the term "real touch" denotes a case in which a pointer, finger, or the like, makes contact with a screen, and the term "proximity touch" denotes a case in which the pointer does not actually touch the screen but approaches a position separated from the screen by a proximate distance. The pointer used herein denotes a touch instrument for really touching or proximity-touching a portion of a displayed screen. Examples of the pointer include an electronic pen, a finger, etc.

FIG. 1 is a diagram illustrating verifying a signature via a real touch and a proximity touch, according to an exemplary embodiment.

Referring to FIG. 1, signature verification apparatus 100 may determine whether a signature generated by a proximity touch or by a real touch and a proximity touch of a user is that of an authenticated user based on a pre-stored signature. For example, the signature verification apparatus 100 may determine whether the input signature is that of an authenticated user using not only a signature directly input via a real touch on the touch screen but also a signature input via a proximity touch on the touch screen.

The signature verification apparatus 100 may authenticate or verify the input signature based on the pre-stored signature. Accordingly, the signature verification apparatus 100 may authenticate the identity of a person, for example, who is attempting to use a computer, a mobile phone, communication network shared by many people, and the like, and may verify whether a signature of a user is a signature of a specific person.

The signature verification apparatus 100 may construct a new signature by adding a signature generated by a real touch of a user and a signature generated by a proximity touch of the user and determine whether the new signature is consistent with the pre-stored signature. For example, the signature verification apparatus 100 may compare the new signature with that of the pre-stored signature to determine the likeness of the two signatures. In response to the likeness being at or above a predetermined threshold, the signature verification apparatus 100 may determine that the person entering the new signature is an authorized user.

The signature verification apparatus 100 may compare each of the signatures generated by the real touch and the proximity touch of the user with the pre-stored signature to determine whether each of the generated signatures is consistent with the pre-stored signature. For example, the signature verification apparatus 100 may apply a weight value to the signature generated by the proximity touch in order to determine the consistency or inconsistency of the two signatures.

According to various aspects, when a user is attempting to input a signature using a finger or stylus on a touch screen, the touch performed by the user may not be continuous. In other words, a user may accidentally or intentionally lose contact with a touch screen at a point while making the drawing motion of the signature. The signature verification apparatus 100 may perform a more detailed analysis of a user's signature based on proximity touches in addition to the real touches performed by a user.

To receive a touch input, the signature verification apparatus 100 may include a real touch sensor and a proximity touch sensor. When a user inputs a signature to a touch screen of the signature verification apparatus 100, the signature verification apparatus 100 may acquire a location on the touch screen that is directly touched by the user and also acquire an amount of pressure applied to the touch screen, using the real touch sensor. In addition, while the user is inputting a signature to the touch screen, the signature verification apparatus 100 may also acquire a location on the touch screen that is proximity-touched by the user, using the proximity touch sensor. For example, a location of a user's finger or stylus immediately before contacting the touch screen or immediately after contacting the touch screen while the user inputs the signature may also be sensed. The real touch sensor and the proximity touch sensor may sense an approach or touch of a pointer at regular time intervals.

The real touch sensor and the proximity touch sensor may be included in the signature verification apparatus 100. For example, the real touch sensor and the proximity sensor may be formed in a layer within a display device. Accordingly, when a user inputs a signature to the touch screen, the signature verification apparatus 100 may display a trace of a touch of the user at the same location on a display of the display device that is touched by the user.

The real touch sensor senses an object when the object contacts a sensing surface and/or a pressure applied to the sensing surface. The real touch sensor may be a keypad, for example, a capacitive overlay type, a resistive overlay type, an infrared beam type, a surface acoustic wave type, an integral strain gauge type, a piezoelectric type, and the like, but is not limited thereto. Accordingly, the real touch sensor may sense not only a coordinate position or location of the object but also an amount of pressure applied by the object.

The proximity touch sensor senses the existence of an object that approaches the sensing surface or an object that exists nearby, without physical contact occurring. For example, the proximity touch sensor may use an electromagnetic force, radiation such as infrared rays, and the like. Accordingly, the proximity touch sensor may sense a coordinate position or location of the object.

Examples of the proximity touch sensor include, but are not limited to, a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, and the like.

The display may include at least one of a liquid crystal display (LCD), a thin film transistor-liquid crystal display (TFT-LCD), an organic light-emitting diode (OLED) display, an active-matrix organic light-emitting diode (AMOLED) display, a flexible display, a 3D display, and the like, but is not limited thereto.

Figure 2A:
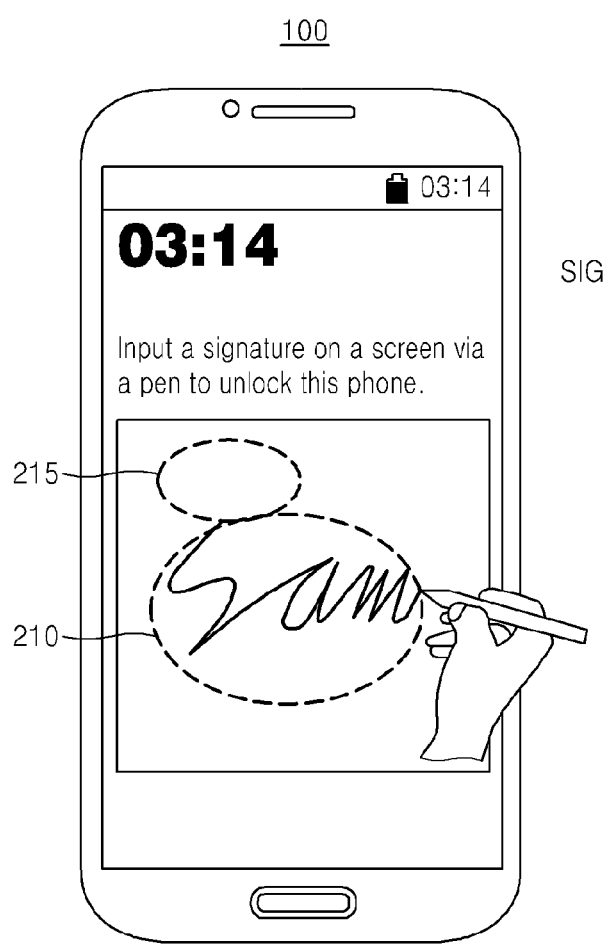
FIGS. 2A and 2B illustrate a signature verification apparatus receiving a signature input by a user via a proximity touch according to an exemplary embodiment.
Figure 2B:
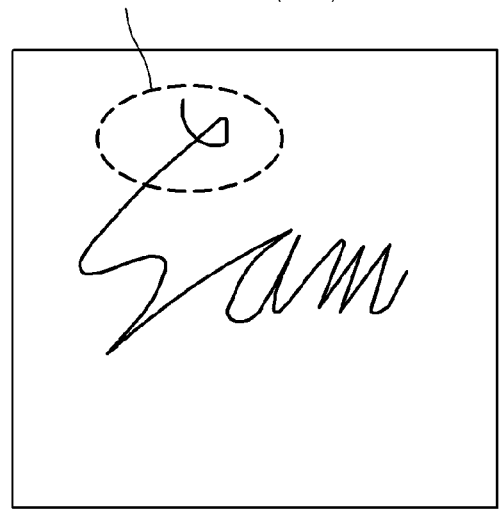

FIGS. 2A and 2B illustrate examples in which the signature verification apparatus 100 receives a signature input from a user via a proximity touch.

The signature verification apparatus 100 may acquire coordinates of a portion of the signature corresponding to a real touch of the user using the real touch sensor and may display a representation of the touched portion on the display based on the acquired coordinates. The signature verification apparatus 100 may also acquire coordinates of a portion of the signature corresponding to a proximity touch of the user using the proximity touch sensor and may display a representation of the proximately touched portion on the display based on the acquired coordinates.

FIG. 2A illustrates a screen image including a signature input by a user to unlock a mobile phone. As illustrated in FIG. 2A, the signature verification apparatus 100 may display on the display a trace representation of real touch events but not proximity touch events. That is, while the user is inputting the signature, the signature verification apparatus 100 may display only a real-touched portion 210 on the display and not a proximity-touched portion 215.

FIG. 2B illustrates a signature used for authenticating a user. In this example, the signature data used in authentication includes both signature data acquired by a real touch and signature data 220 acquired by a proximity touch. Accordingly, the signature verification apparatus 100 may determine the authenticity of a signature, based on the signature data acquired by the proximity touch as well as the signature data acquired by the real touch. To further protect a user, for example, the signature verification apparatus 100 may prevent complete exposure of the signature of a user by not displaying a proximity-touch portion on the display.

Because the signature verification apparatus 100 uses the signature data acquired by the proximity touch as well as the signature data acquired by the real touch, the signature verification apparatus 100 may determine the authenticity of a signature based on more data that is acquired from the user. Furthermore, because a signature detected includes a proximity touch portion, it is possible to also detect a unique shape, a unique speed, and the like, that cannot be predicted from a real touch portion. Accordingly, the accuracy and security of an authentication may be more reliable.

Figure 3:
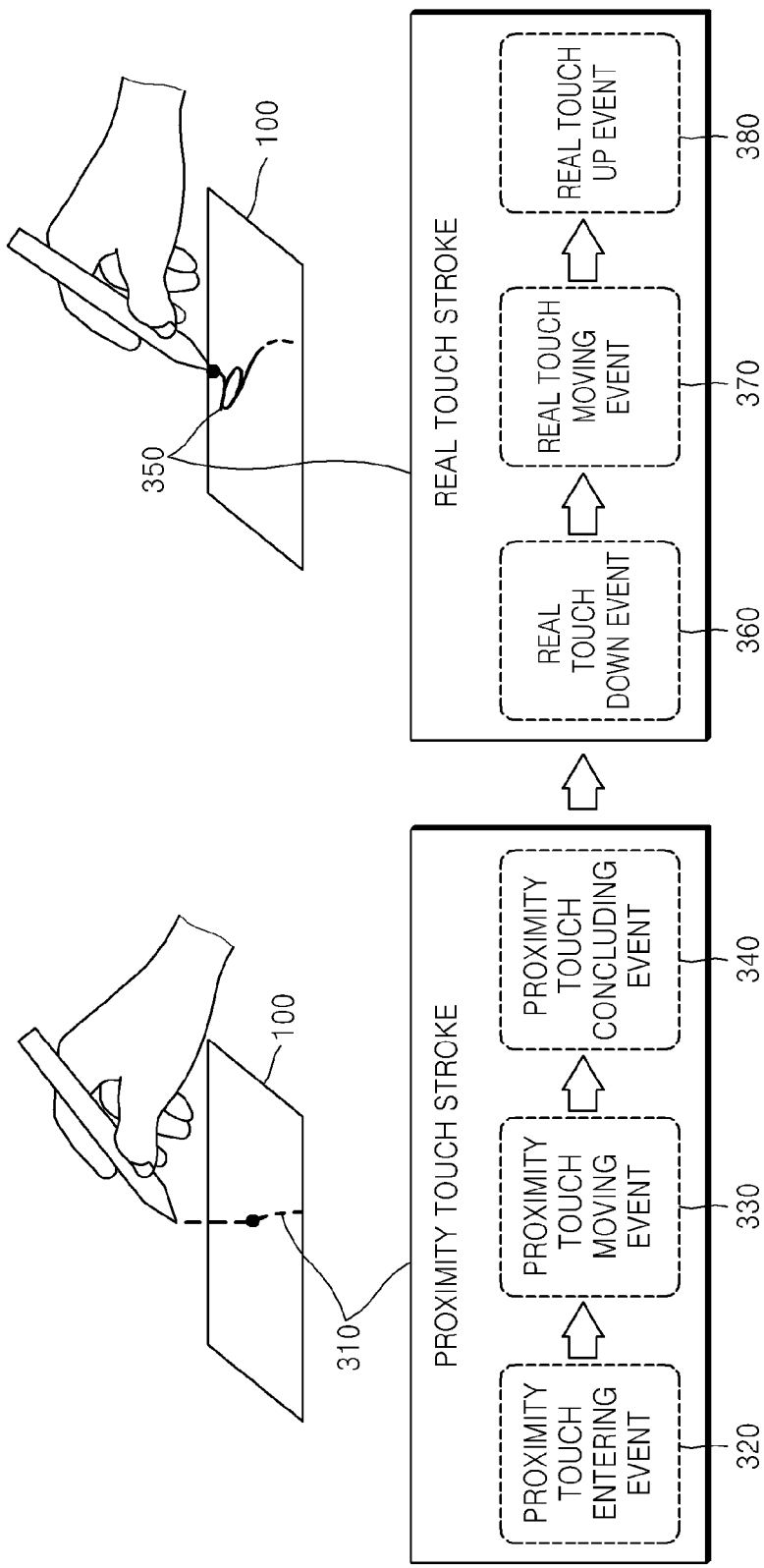
FIG. 3 illustrates a process in which signature data is generated by a real touch and a proximity touch, according to an exemplary embodiment.

FIG. 3 illustrates a process in which signature data is generated by a real touch and a proximity touch, according to an exemplary embodiment.

Referring to FIG. 3, proximity touch event includes a proximity touch entering event 320, a proximity touch moving event 330, and a proximity touch concluding event 340. In the proximity touch entering event 320, a user moves a pointer toward the proximity touch sensor and a proximity touch is sensed. In the proximity touch moving event 330, the user moves the pointer and continues to make a proximity touch and the position of the sensed proximity touch moves. In the proximity touch concluding event 340, the user moves the pointer away from the proximity touch sensor and the proximity touch of the user is concluded.

A real touch event includes a real touch down event 360, a real touch moving event 370, and a real touch up event 380. In the real touch down event 360, a user brings a pointer into contact with the real touch sensor and a real touch is sensed. In the real touch moving event 370, the user continues to move the pointer while maintaining contact with the touch screen and the position of the sensed real touch moves. In the real touch up event 380, the user moves the pointer away from the real touch sensor and the real touch of the user is concluded.

A single real touch stroke 350 is a sequence of coordinates at which the pointer is moved to between a single real touch down event 360 occurs and a single real touch up event 380, or otherwise, a trace of a real touch. For example, the single real touch stroke 350 may be a trace of a signature generated from a point in time when the pointer contacts the real touch sensor and when the contact is concluded. The single real touch stroke 350 may include a trace of a plurality of real touch moving events.

A single proximity touch stroke 310 is a sequence of coordinates at which the pointer is moved to between a single proximity touch entering event 320 occurs and a single proximity touch concluding event 340 occurs, or otherwise, a trace of a proximity touch. For example, the single proximity touch stroke 310 may be a trace of a signature generated between a point in time when the pointer is sensed by the proximity touch sensor and when the sensing is concluded. The single proximity touch stroke 310 may include a trace of a plurality of proximity touch moving events.

For example, during a single signature operation performed by a user, a plurality of real touch strokes 350 and a plurality of proximity touch strokes 310 may occur. Prior to a real touch down event occurring, a proximity touch concluding event may occur. Likewise, after a real touch up event occurs, a proximity touch entering event may occur. Accordingly, proximity touch strokes 310 may occur before and after a real touch strokes 350. Therefore, a single signature operation may start with the proximity touch stroke 310, alternate between the real touch stroke 350 and the proximity touch stroke 310, and end with the proximity touch stroke 310. The proximity touch strokes 310 occurring at the beginning and/or at the end of a signature may exhibit the most unique features of a signature of a user. For example, because the user's finger, stylus, or the like, is not restricted by contacting the surface of the screen, a user's proximity input may represent a more natural and fluid motion of the user.

The signature verification apparatus 100 may determine a coordinate at which a real touch or proximity touch occurs and a point of time at which the real touch or proximity touch occurs using the real touch or proximity touch sensor. The signature verification apparatus 100 may also determine an amount of pressure applied to the touch screen by the user when a real touch event occurs, using the real touch sensor.

The signature verification apparatus 100 may sequentially store the real and proximate touch events as a user inputs a signature, and thus, may generate signature data. For example, the signature verification apparatus 100 may generate signature data by storing a point 312 corresponding to each real or proximity touch event. For example, the point may include a coordinate (e.g., X1 and Y1) at which the real or proximity touch event occurs, a point in time (e.g., T1 ms, T2 ms, or T3 ms) when the real or proximity touch event occurs, the type of touch event (e.g., proximity touch entering event, real touch up event), and pressure (e.g., P1, P2, or P3) applied to the touch screen when the real touch event occurs. The signature verification apparatus 100 may determine a trace of the input signature by connecting points to each other.

Furthermore, the signature verification apparatus 100 may extract features of the signature using the signature data and may verify the signature according to whether the extracted feature of the signature is consistent with that of the pre-stored signature.

Figure 4:
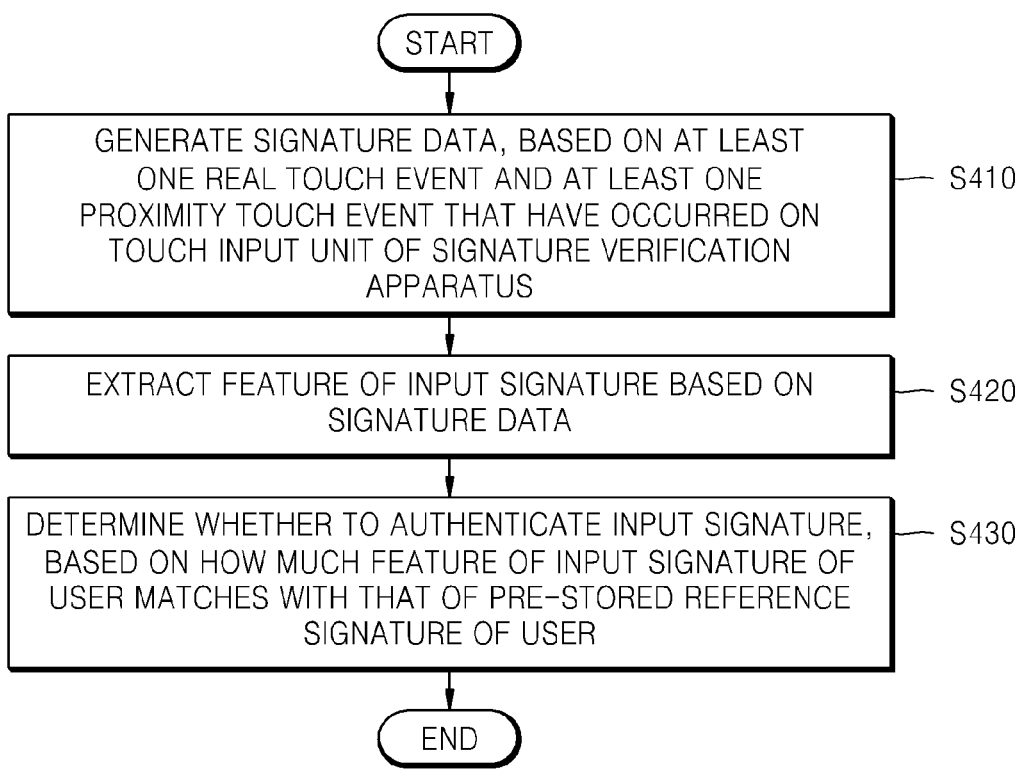
FIG. 4 is a flowchart of a signature verification method according to an exemplary embodiment.

FIG. 4 is a flowchart of a signature verification method according to an exemplary embodiment.

Referring to FIG. 4, in operation S410, the signature verification apparatus 100 generates signature data based on at least one real touch event and/or at least one proximity touch event that have occurred on a touch input unit of the signature verification apparatus 100. The signature verification apparatus 100 may generate a point by detecting a real touch event and a proximity touch event that occur as the user inputs the signature to the touch input unit and store coordinates of the detected points. The signature verification apparatus may also store points at a time when the detected points occur, an amount of pressure applied to the touch input unit, the types of events that occur, and the like. The signature verification apparatus 100 may generate a representative signature of a user by ordering a plurality of points according to the sequence in which the points are input.

In operation S420, the signature verification apparatus 100 extracts a feature of the input signature based on the signature data generated in operation S410. For example, the signature verification apparatus 100 may extract points and a trace obtained by connecting the coordinates of the points in chronological order, as the feature of the input signature. The signature verification apparatus 100 may extract a coordinate value at each point, a speed of a trace at the point, an acceleration of the trace at the point, an amount of pressure applied to the touch input unit of the signature verification apparatus 100 at the point, an inflection rate of the trace in the point, an inclination of a pointer used at the point, a type of event that has occurred at the point (e.g., a proximity touch event or a real touch event), and the like.

The signature verification apparatus 100 may also extract global features of the signature, for example, an overall duration of the signature, a number of real touch strokes and a number of proximity touches in the entire signature, a direction of the entire signature, and the like. The signature verification apparatus 100 may also extract regional features including a ratio between the height and the width of a stroke, a direction of the stroke, whether the stroke has occurred by a real touch or a proximity touch, and the like.

The feature extracted from the signature data may be determined based on a pre-stored reference signature. The pre-stored reference signature may be used for determining whether the input signature is authentic. As an example, the signature verification apparatus 100 may receive a plurality of signatures from a user in advance, study the received plurality of signatures, and extract a unique feature of the user from among the features that are consistent between the plurality of signatures.

In operation S430, the signature verification apparatus 100 may determine whether to authenticate the input signature based on how much the feature of the input signature of the user matches that of the pre-stored reference signature of the user. As a non-limiting example, in order to determine whether the input signature matches with the pre-stored reference signature, the signature verification apparatus 100 may use a root mean square (RMS) method, a dynamic time warping (DTW) method, a neutral network method, a hidden Markov model method, a Euclidean distance method, and the like.

The signature verification apparatus 100 may determine whether the input signature is matching or non-matching (i.e. how similar the signatures are) by comparing a function representing the feature of the input signature with a function representing the feature of the pre-stored reference signature in units of coordinates using the RMS method and accumulate differences resulting from the comparisons. As another example, the signature verification apparatus 100 may determine whether the input signature is matching or non-matching by detecting a matching path that has the most similarity from among all possible matching paths of the function representing the feature of the input signature and the function representing the feature of the pre-stored reference signature using the DTW method. As another example, if the features of the input signature and the pre-stored reference signature are calculated as a plurality of vectors, the signature verification apparatus 100 may determine whether the input signature and the pre-stored reference signature match by calculating a Euclidean distance between the vectors.

The signature verification apparatus 100 may calculate the degree of similarity between the input signature and the pre-stored reference signature, and may authenticate the input signature when the similarity degree is equal to or greater than a predetermined reference degree. The signature verification apparatus 100 may determine whether to authenticate the input signature based on a plurality of pieces of feature information. As another example, the signature verification apparatus 100 may determine whether to authenticate the input signature by weighing a feature that greatly differs from that of a fake signature like a unique feature that is input by a proximity touch and that is consistently input by a user over several signature inputs.

According to various aspects, because the signature verification apparatus 100 may determine whether the input signature and the pre-stored reference signature match based on the signature data that is acquired by the proximity touch sensor as well as the signature data acquired by the real touch sensor, the signature verification apparatus 100 may more accurately determine whether an input signature is that of an authorized user.

The signature verification apparatus 100 may construct signature data about a single signature, based on signature data generated by a real touch of a user and signature data generated by a proximity touch of the user. The signature verification apparatus 100 may extract a feature from a plurality of points of the signature, based on the signature data. The signature verification apparatus 100 may determine an arrangement of the extracted features in chronological order. The signature verification apparatus 100 may determine a likeness between the input signature and the pre-stored reference signature, based on the determined arrangement of features, examples of which are described with reference to FIGS. 5 and 6.

FIG. 5 is a flowchart of a method of verifying a signature based on the degree of similarity between the points of two signatures, according to an exemplary embodiment.

Referring to FIG. 5, in operation S510, the signature verification apparatus 100 generates signature data based on a real touch event and a proximity touch event that occur on a touch input unit of the signature verification apparatus 100. For example, the signature verification apparatus 100 may generate signature data representing a trace of a signature input by a user, by sequentially arranging points generated by real and proximity touch events.

In operation S520, the signature verification apparatus 100 normalizes the signature data. To extract a feature from the signature data and compare the extracted feature with a feature of a reference signature, it is beneficial for the two signatures to be the same in terms of a spatial or temporal size in some cases. For example, the feature of the points of the input signature and the points of the pre-stored reference signature may be represented as functions over time and compared with each other. However, the lengths of the two signatures, namely, data sizes thereof, may be different. When the overall sizes of the two signatures greatly differ, it may be difficult to compare the coordinates. Thus, a normalizing process may be performed to equalize the data sizes.

To normalize the signature data, the signature verification apparatus 100 may delete some points or may generate new points via interpolation. As another example, the signature verification apparatus may reduce or enlarge the size of an input signature based on the pre-stored reference signature.

In operation S530, the signature verification apparatus 100 extracts a feature from each point of the input signature. For example, the feature of each point may be the coordinate value of the point, the speed of a trace at the point, the acceleration of the trace at the point, the pressure applied to the touch input unit at the point, the inflection rate of the trace at the point, the inclination of the pointer used at the point, the type of event that has occurred (e.g., a proximity touch event or a real touch event), and the like.

For example, the signature verification apparatus 100 may determine a speed of a trace at a certain point by calculating a rate of change of coordinate values (i.e., x and y coordinates) based on a difference in time between the input at the certain point and its adjacent point. The signature verification apparatus 100 may determine an acceleration of the trace at the certain point by calculating a rate of a change of speed based on the difference of time between the input at the certain point and its adjacent point.

In operation S540, the signature verification apparatus 100 determines the degree of similarity between the input signature and the pre-stored reference signature, based on the extracted features of the points. For example, the signature verification apparatus 100 may determine how closely the input signature and the pre-stored reference signature match, using any of various matching/non-matching determination methods including a DTW method, and the like.

In operation S550, the signature verification apparatus 100 may determine whether the input signature is from an authorized user based on the similarity degree determined in operation S540. For example, the signature verification apparatus 100 may authenticate the input signature when it is determined that the degree that the input signature matches the reference signature is equal to or greater than a predetermined amount.

Figure 6A:
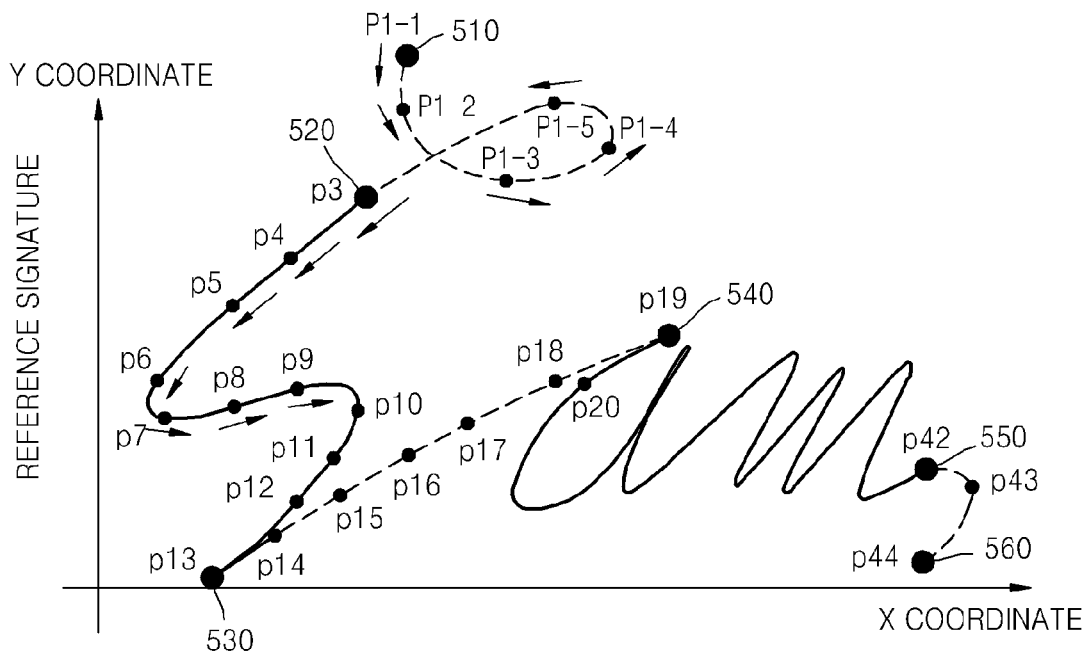
FIGS. 6A and 6B illustrate graphs showing points of a signature according to exemplary embodiments.
Figure 6B:
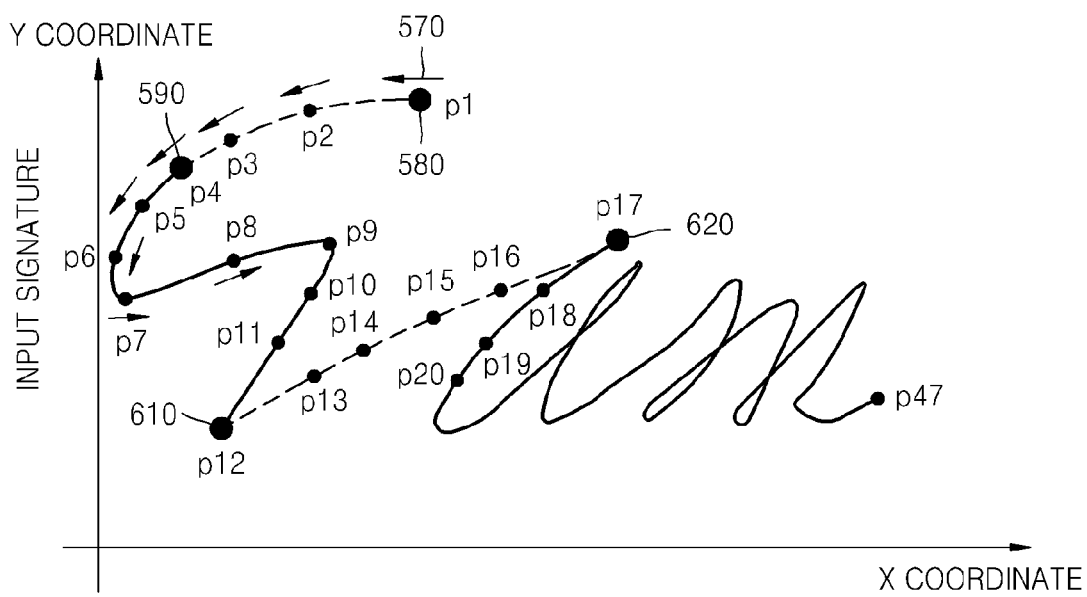

FIGS. 6A and 6B illustrate graphs showing points of a signature according to exemplary embodiments. For example, FIG. 6A refers to a reference signature previously stored, and FIG. 6B refers to a signature currently input by a user.

As illustrated in FIG. 6, the signature verification apparatus 100 may generate signature data representing a trace of an input signature, by sequentially arranging points generated from real and/or proximity touch events. In this example, points 1-1(510) through 3(520), points 13(530) through 19(540), and points 42(550) through 44(560) of a reference signature in FIG. 6A are points generated by proximity touch events. Likewise, points 1(580) through 4(590) and points 12(610) through 17(620) of an input signature in FIG. 6B are points generated by proximity touch events.

In the example of FIG. 6B, the signature verification apparatus 100 may represent the coordinates of points of each input signature, a speed 570 of a trace at the point, an acceleration of the trace at the point, a pressure applied at the point, an inflection rate at the point, an inclination of the user pointer, and whether the point is generated by a proximity touch event or a real touch event, as a function over time to determine whether the input signature in FIG. 6B matches the reference signature in FIG. 6A.

For example, a feature of the point 4(590) of the input signature in FIG. 6B may be compared with a feature of the point 3(520) of the reference signature in FIG. 6A. Accordingly, the signature verification apparatus 100 may determine a degree of similarity between the input signature in FIG. 6B and the reference signature in FIG. 6A by accumulating similarities between the features of the various points. In this case, normalization of the input signature in FIG. 6B may be previously performed. Furthermore, the degree of similarity may be calculated using a DTW method, a neutral network method, a hidden Markov model method, and the like.

In this example, the signature data generated by a proximity touch is distinguished from signature data generated by a real touch and proximity touch events and real touch events occur consecutively. Accordingly, the signature verification apparatus 100 may set, as a feature, information identifying whether each point has been generated by a proximity touch event or a real touch event to more accurately determine the whether the signature is input by an authorized user.

Furthermore, in a situation in which a real touch of a user is not recognized due to a malfunction of the sensor, or the like, a trace intended by the user may be recognized according to proximity touch events, and thus, the authentication of an input signature may be more accurately determined.

Furthermore, a proximity-touch portion of the reference signature may be formed with a unique shape, a unique speed, and the like that cannot be predicted from a real touch portion thereof. For example, in the case of the points p1-1 through p3 or the points p42 through p44 of the reference signature in FIG. 6A, the proximity-touch portion is different from that of the input signature in FIG. 6B in terms of point features. Thus, the accuracy and security of signature verification may be improved. For example, in this case the signature verification apparatus may determine that the input signature is not that of an authorized user based on the discrepancies between the proximity touch portions of the input signature and the reference signature.

The signature verification apparatus 100 may determine the degree that the input signature and the reference signature match by comparing proximity touch strokes and real touch strokes included in an input signature with those of a reference signature. Accordingly, the signature verification may determine whether to authenticate the input signature, based on the determined degree of matching, examples of which are described with reference to FIGS. 7 and 8.

Figure 7:
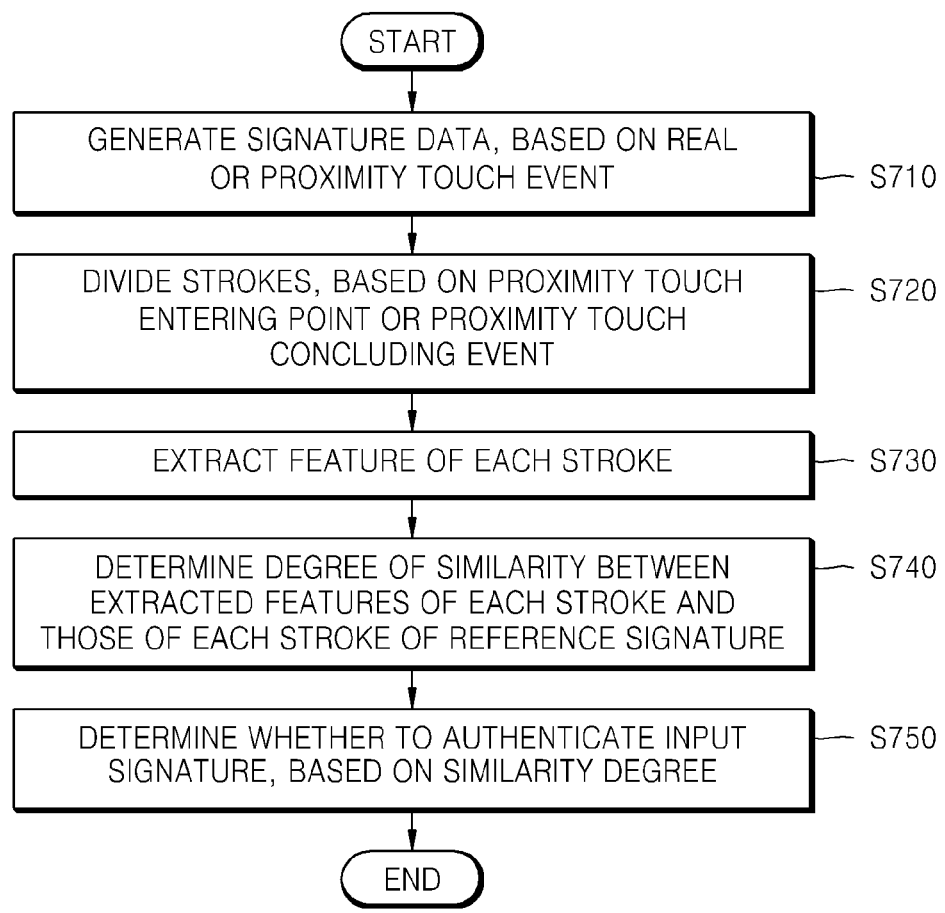
FIG. 7 is a flowchart of a method of verifying a signature based on the degree of similarity between strokes, according to an exemplary embodiment.

FIG. 7 is a flowchart of a method of verifying an input signature based on the degree of similarity between strokes, according to an exemplary embodiment.

Referring to FIG. 7, in operation S710, the signature verification apparatus 100 generates signature data based on a real and/or proximity touch event that occurs on the touch input unit of the signature verification apparatus 100. An example of this operation is described above with reference to operation S410 of FIG. 4.

In operation S720, the signature verification apparatus 100 divides a user input into a plurality of strokes based on, for example a proximity touch entering point, a proximity touch concluding event, and the like. Accordingly, the signature verification apparatus 100 may separate a proximity touch stroke including proximity touch events from a real touch stroke including real touch events.

In operation S730, the signature verification apparatus 100 extracts a feature of each stroke. The signature verification apparatus 100 may extract features of points included in each stroke and represent the extracted features in the form of a function over time. For example, coordinate values, speeds, accelerations, pressure values, types of touch events, and the like, may be extracted as features from the points included in each stroke.

The signature verification apparatus 100 may extract a global feature of each stroke. For example, the signature verification apparatus 100 may extract a direction of a stroke, a ratio of a width and a height of the stroke, a duration of the stroke, a length of the stroke, a number of points of the stroke, whether the stroke is a proximity touch stroke, and the like.

In operation S740, the signature verification apparatus 100 determines a degree of similarity between the extracted features of each stroke and the strokes of a pre-stored reference signature. The strokes may be represented as functions occurring over a period of time. For example, the signature verification apparatus 100 may compare the features of the points included in a stroke of an input signature with a corresponding stroke of a reference signature to thereby determine the degree of similarity between the points included in the two strokes.

The signature verification apparatus 100 may determine the degree of similarity between the points included in the strokes using various methods including the above-described DTW method, and the like. As another example, the signature verification apparatus 100 may determine the degree of similarity by comparing a global feature of the stroke of the input signature with that of the corresponding stroke of the reference signature.

In operation S750, the signature verification apparatus 100 determines whether to authenticate the input signature based on the matching degree determined in operation S740. For example, the signature verification apparatus 100 may accumulate similarity degrees of the strokes of the input signature and may authenticate the input signature when an accumulation of the similarity degrees is equal to or greater than a predetermined value.

The signature verification apparatus 100 may determine whether to authenticate the input signature, by weighing each of the strokes. For example, by weighing the similarity degree of proximity touch strokes, the signature verification apparatus 100 may authenticate the input signature when the similarity degree of the proximity touch stroke or strokes is equal to or greater than a predetermined reference, even though the similarity degree of a real touch stroke is low.

For example, proximity touch strokes occurring at the beginning and end of a signature of a user may exhibit the most unique feature of the user's signature. Accordingly, accuracy and security of verification may be increased by giving more weight to the authenticity of the proximity touch strokes occurring at the beginning and end of the signature.

Figure 8A:
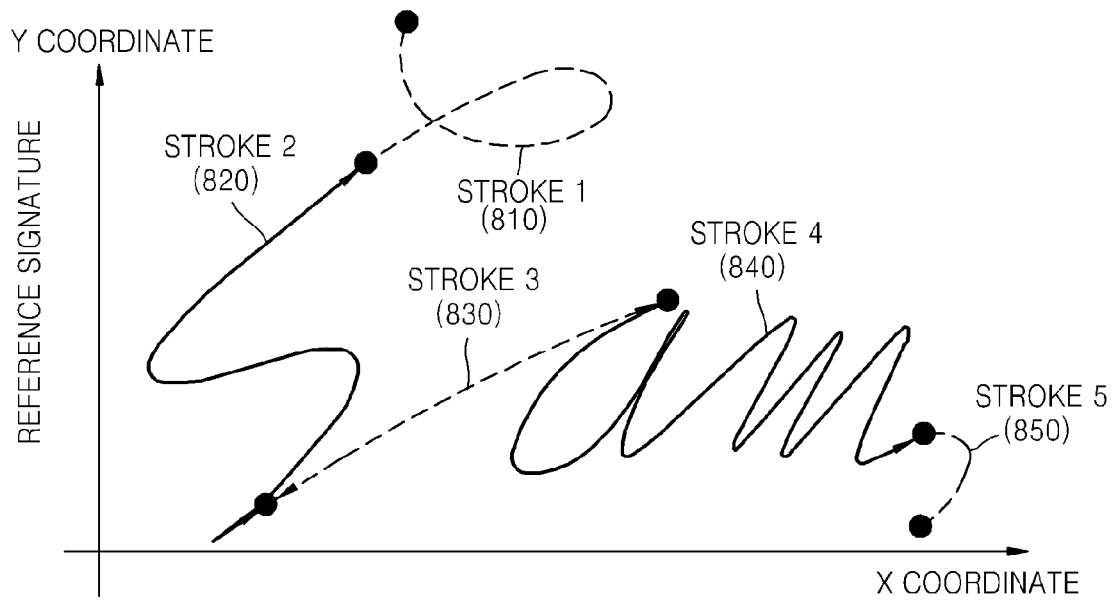
FIGS. 8A and 8B illustrate graphs showing strokes of a signature according to exemplary embodiments.
Figure 8B:
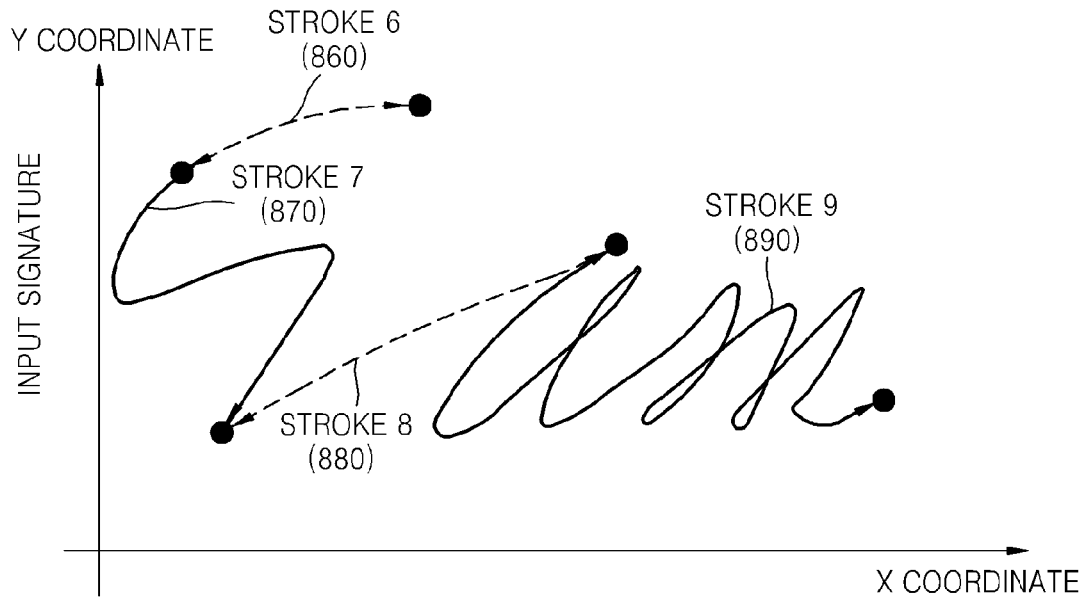

FIGS. 8A and 8B illustrate graphs showing strokes of a signature according to exemplary embodiments. In this example, the signature in FIG. 8A refers to a reference signature and the signature in FIG. 8B refers to an input signature.

As illustrated in FIG. 8A, the reference signature includes a stroke 1(810), a stroke 3(830), and a stroke 5(850), which are proximity touch strokes, and a stroke 2(820) and a stroke 4(840), which are real touch strokes. As illustrated in FIG. 8B, the input signature includes a stroke 6(860) and a stroke 8(880), which are proximity touch strokes, and a stroke 7(870) and a stroke 9(890), which are real touch strokes.

The signature verification apparatus 100 may determine strokes of a reference signature that correspond to the strokes of an input signature based on an order in which the strokes of the input signature occur, coordinates of points constituting each stroke, the directions of the strokes, and the like. For example, the signature verification apparatus 100 may determine a correspondence between the stroke 6(860) in FIG. 6B and the stroke 1(810) in FIG. 6A, between the stroke 7(870) and the stroke 2(820), between the stroke 8(880) and the stroke 3(830), and a correspondence between the stroke 9(890) and the stroke 4(840), respectively.

The signature verification apparatus 100 may extract, for example, the direction of each stroke, a ratio of the width to the height of the stroke, a duration of the stroke, a length of the stroke, a number of points constituting the stroke, and the like, as features of the stroke. Accordingly, the apparatus may determine a degree of similarity between the stroke of an input signature and a stroke of the reference signature corresponding to the stroke, based on the extracted features.

In this example, there is a difference between the overall direction of stroke 6 in FIG. 8B and that of the stroke 1 in FIG. 8A and there is also a significant difference therebetween in terms of length, shape, and coordinates. In contrast, stroke 8 of FIG. 8B almost matches stroke 3 in FIG. 8A in terms of overall direction and length. Thus, the signature verification apparatus 100 may determine that the similarity degree of the stroke 8 is high and that the similarity degree of the stroke 6 is low.

In some examples, the first and last proximity touch strokes of an input signature may be given greater weight. Accordingly, the signature verification apparatus 100 may determine that the input signature is not that of an authorized user when the first and last proximity touch strokes of the input signature do not match or the input signature has no first and last proximity touch strokes, even when the other strokes are equal to or greater than a predetermined reference. In this case, because the input signature in FIG. 8B does not have a proximity touch stroke corresponding to the stroke 5 of the reference signature in FIG. 8A, the signature verification apparatus 100 may determine that the signature in FIG. 8B is not that of an authorized user.

Figure 9:
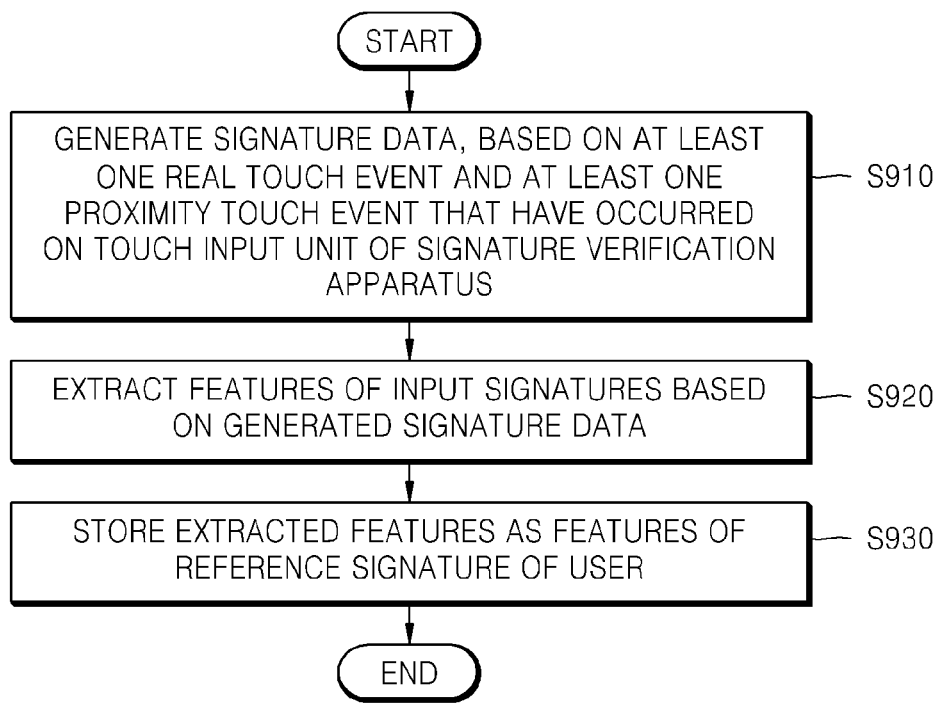
FIG. 9 is a flowchart of a method for setting a reference signature according to an exemplary embodiment.

FIG. 9 is a flowchart of a method for setting a reference signature according to an exemplary embodiment.

According to various aspects, the signature verification apparatus 100 may receive a plurality of signatures from a user in advance, study or otherwise analyze the received plurality of signatures, and extract one or more unique features of the user's signature from among features that are consistent between the plurality of signatures.

Referring to FIG. 9, in operation S910, the signature verification apparatus 100 generates signature data based on at least one real touch event and at least one proximity touch event that occur on the touch input unit of the signature verification apparatus 100. To generate a single reference signature from the same user, the signature verification apparatus 100 may receive a plurality of input signatures, analyze the plurality of input signatures, and generate signature data from each of the plurality of input signatures.

In operation S920, the signature verification apparatus 100 extracts features of the input signatures based on the generated signature data. For example, the signature verification apparatus 100 may extract common features from the plurality of signatures input by the same user. The signature verification apparatus 100 may extract points of each input signature in the form of a function over time. Also, the signature verification apparatus 100 may extract a feature of each stroke from each input signature.

In operation S930, the signature verification apparatus 100 stores the extracted features as the features of the reference signature of the user.

Figure 10:
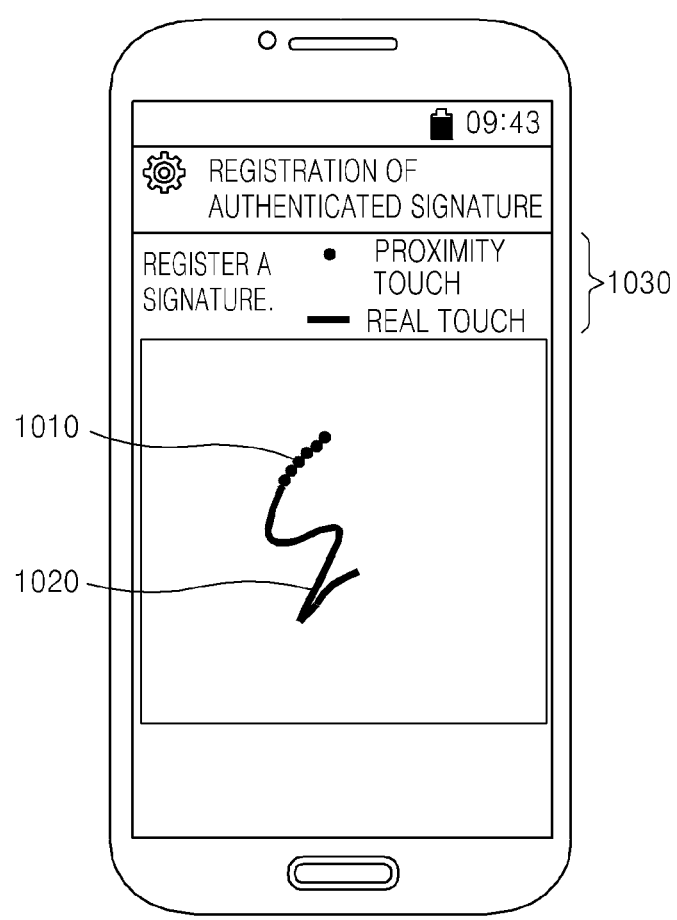
FIG. 10 is a diagram illustrating setting a reference signature according to an exemplary embodiment.

FIG. 10 is a diagram illustrating setting a reference signature according to an exemplary embodiment.

Referring to FIG. 10, the signature verification apparatus 100 may receive a reference signature from a user which the signature verification apparatus may use for signature verification. The signature verification apparatus 100 may display the input reference signature on the display, based on events that occur as the user inputs the reference signature.

In FIG. 10, the signature verification apparatus 100 displays a trace 1010 generated by a real touch and a trace 1020 generated by a proximity touch such that the traces 1010 and 1020 are distinguished from each other. The signature verification apparatus 100 may also display a description 1030 or legend indicating the shapes that represent the proximity touch and the real touch on the display.

By distinguishing and displaying the real touch and the proximity touch, the signature verification apparatus 100 may provide the user with an identification of a proximity touch and an accurate shape in which the reference signature is displayed.

Figure 11:
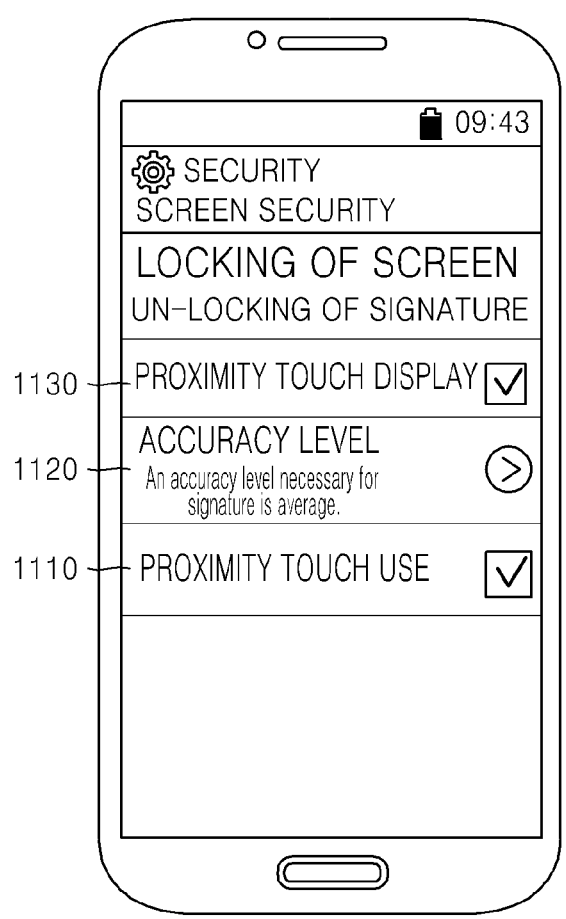
FIG. 11 is a screen image for selecting use or non-use of a proximity touch during signature verification, according to an exemplary embodiment.

FIG. 11 is a screen image for selecting use or non-use of a proximity touch during signature verification, according to an exemplary embodiment.

Referring to FIG. 11, the signature verification apparatus 100 may provide a menu item 1110 that allows a user to select whether to use a proximity touch during signature verification. If the user does not select a proximity touch use, the signature verification apparatus 100 does not use signature data generated by a proximity touch while extracting features of the reference signature.

As another example, the signature verification apparatus 100 may provide a menu item 1120 that allows the user to select an accuracy level of signature verification. For example, if the user sets the accuracy level of signature verification to be high, the signature verification apparatus 100 may use the signature data generated by the proximity touch during reference signature setting or signature verification.

As another example, the signature verification apparatus 100 may provide a menu item 1130 that allows the user to select whether to display a trace of a signature generated by the proximity touch on the display during signature verification. By selecting 'proximity touch display', the signature verification apparatus 100 may display the trace of the signature generated by the proximity touch and the real touch of the user during signature verification.

Figure 12:
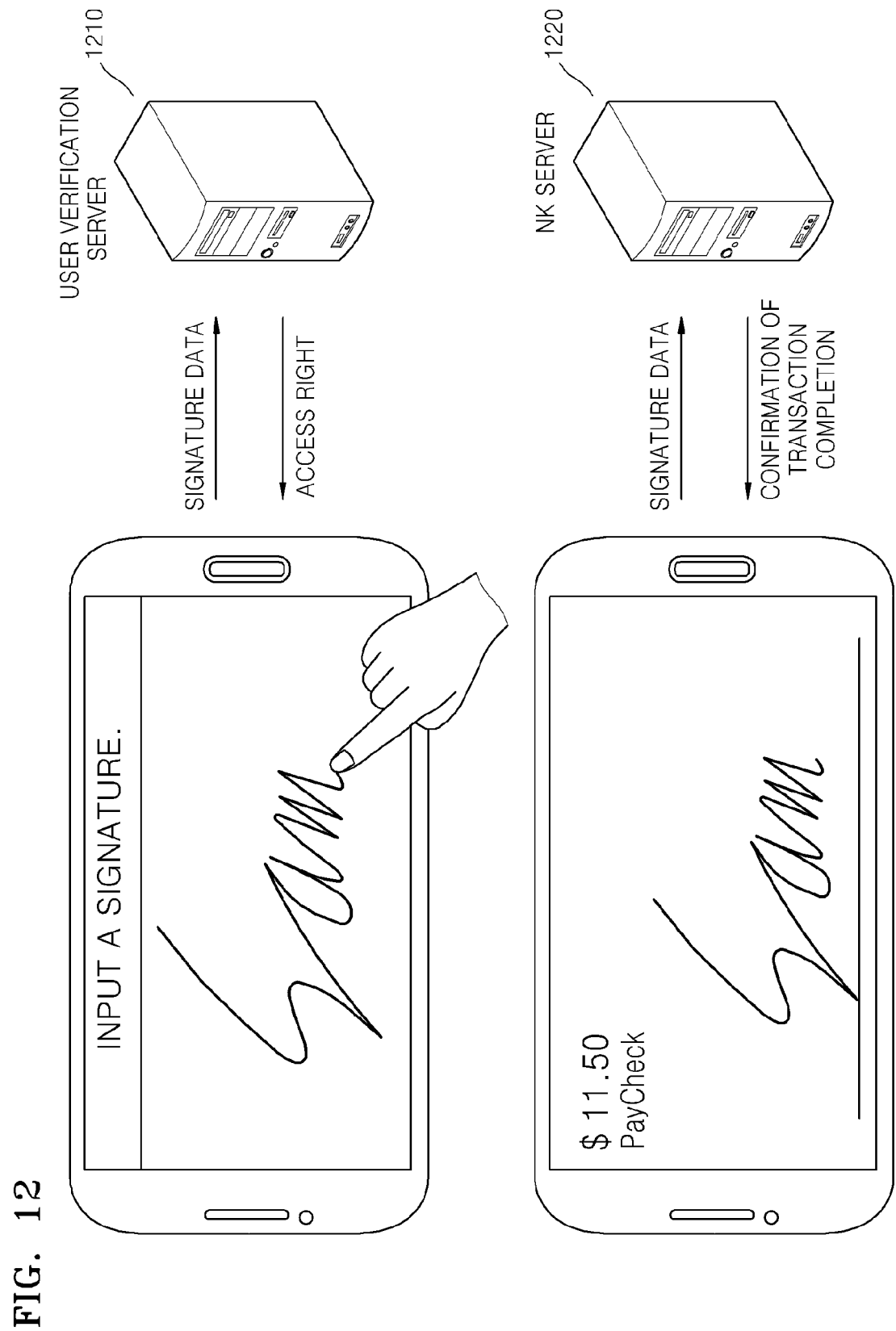
FIG. 12 illustrates various embodiments of using signature data obtained by a proximity touch according to an exemplary embodiment.

FIG. 12 illustrates using signature data obtained by a proximity touch according to an exemplary embodiment.

Referring to FIG. 12, an identification of a specific person may be requested, for example, by a website, an application, a device, a store, and the like. Accordingly, the signature verification apparatus 100 may verify whether an input signature is a signature of the specific person and also determine who input the signature based on a signature database.

For example, a user verification server 1210 may store reference signatures of a plurality of users. The user verification server 1210 may receive feature information of a signature generated by a proximity touch and a real touch of a user from the signature verification apparatus 100. The user verification server 1210 may compare the feature information of the input signature with features of a reference signature of the user. If features of the received signature and the reference signature match at a level that is equal to or greater than a predetermined reference level, the user verification server 1210 may transmit an access right for the user verification server 1210 to the signature verification apparatus 100.

The signature verification apparatus 100 may transmit signature data generated by the real touch and the proximity touch of the user or feature information extracted from the signature data, together with user information, to an external server. For example, the signature verification apparatus 100 may transmit at least one of the signature data generated by the real touch and the proximity touch, user identification information, user trade information, and the like, to an external server such as a bank server 1220.

Figure 13:
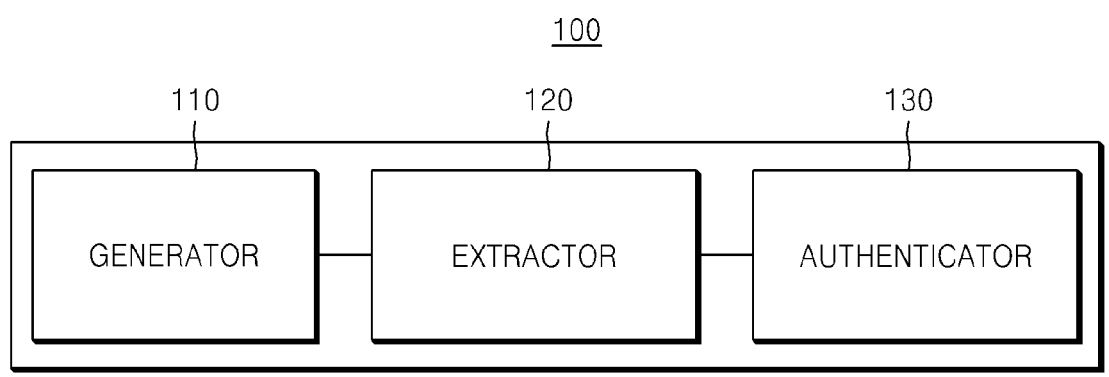
FIG. 13 is a block diagram of a signature verification apparatus according to an exemplary embodiment.

FIG. 13 is a block diagram of a signature verification apparatus 100 according to an exemplary embodiment.

Referring to FIG. 13, the signature verification apparatus 100 includes a generator 110, an extractor 120, and an authenticator 130.

The signature verification apparatus 100 may be a device, for example, a mobile phone, a tablet, a computer, a television, and the like. As another example, functions of the signature verification apparatus 100 may be performed by multiple devices. For example, the generator 110 and the extractor 120 may be included in a single client device, and the authenticator 130 may be included in a server device.

In some examples, the signature verification apparatus 100 may not generate signature data using a proximity touch sensor and a real touch sensor included therein, but instead may receive the signature data from an external device or an external server. As another example, the generator 110 may generate signature data based on at least one real touch event and at least one proximity touch event that have occurred on a touch input unit of the signature verification apparatus 100.

For example, the touch input unit may include the proximity touch sensor and the real touch sensor. The generator 110 may receive touch events from the proximity touch sensor and the real touch sensor to generate signature data about an input signature.

For example, the generator 110 may generate signature data including coordinates at which a real touch event has occurred, a point of time when the real touch event has occurred, and an amount of pressure applied to the touch input unit when the real touch event has occurred, as a real touch event. As another example, the generator 110 may generate signature data including coordinates at which a proximity touch event has occurred and a point of time when the proximity touch event has occurred, as a proximity touch event.

The extractor 120 may extract features of the input signature based on the signature data generated by the generator 110. For example, the features of a signature may include at least one selected from the coordinates of a point, a pressure applied to a touch input unit of a device at the point, a speed of a trace of the signature at the point, an acceleration of the trace of the signature at the point, a curvature of the trace of the signature at the point, the type of touch event for the point, and the like.

The extractor 120 may extract a feature of a real touch stroke that occurs between a real touch down event has occurred and a real touch up event occurs, and a feature of a proximity touch stroke that occurs between a proximity touch entering event occurs and a single proximity touch concluding event occurs.

The features of a signature may also include at least one of the direction of a stroke, the length of the stroke, a duration of the stroke, the type of touch event that generates the stroke, and the like.

The authenticator 130 may determine whether the input signature is that of an authorized user based on the degree of similarity between the features of the input signature and features of a pre-stored reference signature of the user. For example, the authenticator 130 may determine whether to authenticate the input signature based on the features of the points of the input signature. The authenticator 130 may determine whether to authenticate the input signature, based on the features of the real touch stroke and the proximity touch stroke.

Although not depicted in FIG. 13, the signature verification apparatus 100 may further include a display such as a touch screen, a storage device, a communication unit, and the like. Furthermore, the signature verification apparatus may include a controller that includes one or more processing devices for processing operations therein.

The display may display information for signature verification. For example, the display may display a user interface (UI) that the user may use to select whether to verify the input signature based on a proximity touch event. The display may also display a trace of real touch except for proximity touch events, from among the events of the input signature. The display may also display a trace of the proximity touch events in such a way that the trace of the proximity touch is distinguished from the trace of a real touch.

The signature verification apparatus 100 may store data for the signature verification in the storage unit. For example, the storage unit may store data about the reference signature.

The signature verification apparatus 100 may transmit or receive the data for the signature verification to and/or from an external device or an external server via the communication unit. For example, the signature verification apparatus 100 may receive signature data from an external source and determine whether the received signature data is that of an authorized user. The signature verification apparatus 100 may transmit the generated signature data to the external server and receive information about an authentication of the user or an authenticity of the input signature from the external server.

According to various aspects, there is provided a signature verification apparatus that distinguishes between a touch input and a proximity input of a signature that is input by a user on a touch screen. Accordingly, the signature verification apparatus may determine whether the signature input by the user corresponds to an authorized user based on the proximity input of the signature.

Furthermore, the examples herein describe verifying a signature using both a touch input and a proximity input. As another example, it should be appreciated that the signature may be verified by the proximity input or by a portion of the proximity input without taking into account the touch input.

The exemplary embodiments can be embodied in a storage medium including instruction codes executable by a computer such as a program module executed by the computer. A computer-readable recording medium can be any usable medium which can be accessed by a computer and includes all volatile/non-volatile and removable/non-removable media. Further, the computer-readable recording medium may include all computer storage and communication media. The computer storage medium includes all volatile/non-volatile and removable/non-removable media embodied by a certain method or technology for storing information such as computer-readable instruction code, a data structure, a program module, or other data. The communication medium typically includes computer-readable instruction code, a data structure, a program module, or other data of a modulated data signal, or other transmission mechanism, and includes any information transmission medium.

The exemplary embodiments should be considered in descriptive sense only and not for purposes of limitation. Descriptions of features or aspects within each embodiment should typically be considered as available for other similar features or aspects in other embodiments.

While examples have been particularly shown and described with reference to the exemplary embodiments thereof, it will be understood by those of ordinary skill in the art that various changes in form and details may be made therein without departing from the spirit and scope of the present disclosure as defined by the following claims.

What is claimed is:

1. A method of verifying an input signature made, the method comprising:
  receiving a touch event and a proximity touch event that occur on a touch input unit of an apparatus;
  extracting features of the input signature, the features including a touch feature associated with the touch event, and a proximity touch feature associated with the proximity touch event; and
  determining whether to authenticate the input signature based on a first similarity between the touch feature of the input signature and a corresponding touch feature of a previously stored reference signature, and a second similarity between the proximity touch feature and a corresponding proximity touch feature of the previously stored reference signature, wherein the second similarity is given more weight than the first similarity in determining whether to authenticate the input signature.

2. The method of claim 1, further comprising:
  storing at least one of coordinates at which the touch event occurs, a time at which the touch event occurs, and an amount of pressure applied to the touch input unit when the touch event occurs, as a point that corresponds to the touch event and represents a trace of the input signature, and
  storing at least one of coordinates at which the proximity touch event occurs and time at which the proximity touch event occurs, as a point that corresponds to the proximity touch event and represents the trace of the input signature.

3. The method of claim 2, wherein the determining whether to authenticate the input signature comprises:
  calculating a similarity between the input signature and the reference signature based on a feature of each point; and
  determining whether to authenticate the input signature based on the similarity.

4. The method of claim 3, wherein the feature of each point comprises at least one of coordinates of the point, a pressure applied to the touch input unit of the apparatus at the point, a speed of the trace of the input signature at the point, an acceleration of the trace of the input signature at the point, a curvature of the trace of the input signature at the point, and a type of touch event for the point.

5. The method of claim 1, wherein the extracting the features of the input signature comprises extracting a touch feature of a touch stroke which is a trace of touch events that occur between a touch down event and a touch up event, and a proximity touch feature of a proximity touch stroke which is a trace of proximity touch events that occur between a proximity touch entering event and proximity touch concluding event.

6. The method of claim 5, wherein the touch feature of the touch stroke or the proximity touch feature of the proximity touch stroke comprises at least one of a direction of the touch stroke or the proximity touch stroke, a length of the touch stroke or the proximity touch stoke, a duration of the touch stroke or the proximity touch stroke, and a type of touch event by which the touch stroke or the proximity touch stoke is generated.

7. The method of claim 1, wherein the receiving the touch event and the proximity touch event comprises displaying, on a display of the apparatus, a trace of the touch event except for the proximity touch event from among the touch event and the proximity touch event.

8. The method of claim 1, further comprising:
receiving at least one touch event and at least one proximity touch event that occur on the touch input unit of the apparatus;
extracting features of the reference signature, the features including a touch feature associated with the touch event, and a proximity touch feature associated with the proximity touch event; and
storing the feature of the reference signature in correspondence to a user.

9. The method of claim 8, further comprising:
displaying a trace of the at least one touch event on a display of the apparatus; and
displaying a trace of the at least one proximity touch event such that the trace is distinguished from the trace of the at least one touch event.

10. The method of claim 1, further comprising displaying, on a display of the apparatus, a user interface for selecting whether to verify the input signature based on the proximity touch event.

11. A non-transitory computer-readable medium having recorded thereon a computer program that is executable by a computer to perform the method of claim 1.

12. The method according to claim 1, wherein:
the extracted features of the input signature include a beginning proximity touch feature corresponding to the beginning of the input signature, and an ending proximity touch feature corresponding to the ending of the input signature, and
determining whether to authenticate the input signature is further based on a third similarity between the beginning proximity touch feature and a corresponding beginning proximity touch feature of the previously stored reference signature and a fourth similarity between the ending proximity touch feature and a corresponding ending proximity touch feature of the previously stored reference signature, wherein the third similarity and the fourth similarity are given more weight than the first similarity and the second similarity in determining whether to authenticate the input signature.

13. An apparatus for verifying an input signature, the apparatus comprising:
a touch input unit configured to receive a touch event and a proximity touch event that occur on the touch input unit of an apparatus;
a controller configured to extract features of the input signature, the features including a touch feature associated with the touch event, and a proximity touch feature associated with the proximity touch event; and
the controller further configured to determine whether to authenticate the input signature based on a first similarity between the touch feature of the input signature and a corresponding touch feature of a previously stored reference signature, and a second similarity between the proximity touch feature and a corresponding proximity touch feature of the previously stored reference signature, wherein the second similarity is given more weight than the first similarity in determining whether to authenticate the input signature.

14. The apparatus of claim 13, the apparatus further comprising a storage configured to:
store at least one of coordinates at which the touch event occurs, a time at which the touch event occurs, and an amount of pressure applied to the touch input unit when the touch event occurs, as a point that corresponds to the touch event and represents a trace of the input signature, and
store at least one of coordinates at which the proximity touch event occurs and a time at which the proximity touch event occurs, as a point that corresponds to the proximity touch event and represents the trace of the input signature.

15. The apparatus of claim 14, wherein the controller is configured to calculate a similarity between the input signature and the reference signature based on a feature of each point, and determine whether to authenticate the input signature based on the similarity.

16. The apparatus of claim 15, wherein the feature of each point comprises at least one of coordinates of the point, a pressure applied to the touch input unit of the device at the point, a speed of the trace of the input signature at the point, an acceleration of the trace of the input signature at the point, a curvature of the trace of the input signature at the point, and a type of touch event for the point.

17. The apparatus of claim 13, wherein
the controller is configured to extract a touch feature of a touch stroke which is a trace of touch events that occur between a touch down event and a touch up event, and a proximity feature of a proximity touch stroke which is a trace of proximity touch events that occur between a proximity touch entering event and a proximity touch concluding event.

18. The apparatus of claim 17, wherein the touch feature of the touch stroke or the proximity touch feature of the proximity touch stroke comprises at least one of a direction of the touch stroke or the proximity touch stroke, a length of the touch stroke or the proximity touch stoke, a duration of the touch stroke or the proximity touch stroke, and a type of touch event by which the touch stroke or the proximity touch stoke is generated.

19. The apparatus of claim 13, further comprising a display configured to display a trace of the touch event except for the proximity touch event from among the touch event and the proximity touch event.

20. The apparatus of claim 19, wherein the display is configured to display a user interface for selecting whether to verify the input signature based on the at least one proximity touch event.

21. The apparatus of claim 13, wherein
the touch input unit is configured to receive at least one touch event and at least one proximity touch event that occur on the touch input unit of the apparatus,
the controller is configured to extract features of the reference signature, the features including a touch feature associated with the touch event, and a proximity touch feature associated with the proximity touch event, and
the apparatus further comprises a storage configured to store the feature of the reference signature in correspondence to a user.

22. A signature verification apparatus comprising:
a controller configured to extract features from a signature input by a user on a touch screen, the extracted features including a touch feature associated with a touch input and a proximity feature associated with a proximity input of the signature input by the user; and
the controller further configured to determine whether the signature input by the user corresponds to a signature of an authorized user based on the proximity input and the touch input, wherein the proximity input is given more weight than the touch input.

23. The signature verification apparatus of claim 22, wherein the controller is configured to determine whether the signature input by the user corresponds to the authorized user based on at least one of a proximity input immediately prior to a touch input and a proximity input immediately after a touch input.

24. The signature verification apparatus of claim 22, wherein the controller is configured to determine whether the signature input by the user corresponds to the authorized user based on a proximity input that occurs between two touch inputs.

25. The signature verification apparatus of claim 22, further comprising a touch screen for receiving the signature input by the user.

26. The signature verification apparatus of claim 22, further comprising a receiver configured to receive the signature from an external device.

* * * * *